United States Patent
Parrott et al.

(10) Patent No.: US 7,314,398 B2
(45) Date of Patent: *Jan. 1, 2008

(54) FLOATATION SYSTEM INCLUDING LIFE RAFT

(75) Inventors: David G. Parrott, Escondido, CA (US); Don V. Hitzfield, Mission Viejo, CA (US)

(73) Assignee: Apical Industries, Inc., Oceanside, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/540,025

(22) Filed: Sep. 29, 2006

(65) Prior Publication Data

US 2007/0175378 A1     Aug. 2, 2007

Related U.S. Application Data

(63) Continuation of application No. 10/777,985, filed on Feb. 11, 2004, now Pat. No. 7,115,010, which is a continuation of application No. 09/961,787, filed on Sep. 21, 2001, now Pat. No. 6,709,305.

(51) Int. Cl.
*B63B 35/58*     (2006.01)

(52) U.S. Cl. .................. 441/40; 244/107; 114/345

(58) Field of Classification Search ............... 244/107, 244/905; 114/345, 360; 441/35, 40, 42, 441/80

See application file for complete search history.

(56) References Cited

U.S. PATENT DOCUMENTS

| | | | | |
|---|---|---|---|---|
| 3,181,823 | A * | 5/1965 | Gillmore | 244/137.2 |
| 3,387,802 | A * | 6/1968 | Cruz | 244/102 R |
| 3,506,222 | A * | 4/1970 | Anderson | 244/101 |
| 4,655,415 | A * | 4/1987 | Miller et al. | 244/105 |
| 5,421,757 | A * | 6/1995 | Basiliere | 441/39 |
| 6,644,592 | B2 * | 11/2003 | Parrott et al. | 244/105 |
| 6,709,305 | B2 * | 3/2004 | Parrott et al. | 441/40 |
| 7,115,010 | B2 * | 10/2006 | Parrott et al. | 441/40 |

* cited by examiner

*Primary Examiner*—Ed Swinehart
(74) *Attorney, Agent, or Firm*—Peter K. Hahn; Luce, Forward, Hamilton & Scripps, LLP

(57) ABSTRACT

A floatation system for attachment to a helicopter landing skid includes a girt dimensioned to be attached to a landing skid and a plurality of floats attached to the elongate girt, wherein the plurality of floats are adapted to be converted from a packed configuration to an deployed configuration, and wherein at least one of the plurality of floats extends beneath the elongate girt when the plurality of floats is in the deployed configuration.

16 Claims, 4 Drawing Sheets

FLOATATION SYSTEM INCLUDING LIFE RAFT

CROSS-REFERENCE TO RELATED APPLICATIONS

This application is a continuation of U.S. patent application Ser. No. 10/777,985, filed Feb. 11, 2004, now U.S. Pat. No. 7,115,010 which is a continuation of U.S. patent application Ser. No. 09/961,787, filed on Sep. 21, 2001, which issued as U.S. Pat. No. 6,709,305 on Mar. 23, 2004, which are hereby incorporated in their entirety by reference herein.

FIELD OF THE INVENTION

The present invention is directed to emergency floatation devices, in general, and more particularly to emergency floatation devices for supporting an aircraft on a body of water.

BACKGROUND OF THE INVENTION

The use of floatation devices for buoyantly supporting an aircraft on a body of water has been prevalent for many years. Part-time and full-time fixed floatation systems have been in widespread use for many years. Some aircraft, especially helicopters, are equipped with both inflatable floatation bags and an inflatable life raft. Typically, deflated floatation bags are fixedly attached to the helicopter landing skids and packed tightly within flexible fabric covers. These floatation bags are inflated in order to support the helicopter when ditching or landing in water is anticipated. On the other hand, inflatable emergency rafts are conventionally stored inside the helicopter fuselage, which is disadvantageous for several reasons.

One disadvantage of storing the inflatable raft inside the aircraft is the amount of space that must be allocated to stow the raft. Inflatable rafts of this sort commonly take up more than six cubic feet of space when deflated. Since six cubic feet is the approximate equivalent of two extra passengers, trips to and from an offshore platform, for example, are far less efficient when an inflatable life raft is stowed within the aircraft fuselage. A further disadvantage of storing the inflatable raft inside the aircraft is that the raft must be manually expelled from the aircraft before being inflated, which wastes precious time and may be more difficult if the aircraft is damaged or the passengers are injured. Yet another disadvantage is that some on-board raft systems require significant modification of the aircraft fuselage, (e.g., additional compartment and door) which is very costly.

In view of these shortcomings, there exists a need for an inflatable emergency raft system, which is not stowed within the aircraft fuselage, requires little or no modification of the aircraft and requires minimal manual involvement during an emergency.

Any art discussed above should not be taken as an admission that the art is prior art.

SUMMARY OF THE INVENTION

One aspect of the present invention involves an emergency floatation system for attachment to a helicopter landing skid including at least one inflatable float and an inflatable emergency life raft, wherein the system is adapted to be converted from a packed configuration to a partially deployed configuration by use of a first actuating member, and wherein the system is adapted to be converted from the partially deployed configuration into a fully deployed configuration by use of a second actuating member.

A further aspect of the present invention involves an emergency floatation system for attachment to a helicopter landing skid, wherein the system is adapted to be converted from a fully deployed configuration into a packed configuration by deflating and folding at least one raft and at least one inflatable float.

Another aspect of the present invention involves an emergency floatation system for attachment to a helicopter landing skid including at least one inflatable float and an inflatable emergency life raft, wherein the at least one float is inflated using compressed Helium and the raft is inflated using compressed Nitrogen.

Yet another aspect of the present invention involves an emergency floatation system for attachment to a helicopter landing skid including a girt, at least one inflatable float and an inflatable emergency life raft, wherein the girt is attached to the landing skid, the at least one float is attached to the girt and the life raft attached to the at least one float.

A further aspect of the present invention involves an emergency floatation system for attachment to a helicopter landing skid including a girt, at least one inflatable float and an inflatable emergency life raft, wherein the at least one float is attached to the girt with a flexible float cover including two halves that are fixedly attached to the girt at one end with an adhesive and releasably attached to each other at the other end using fasteners.

Another aspect of the present invention involves an emergency floatation system for attachment to a helicopter landing skid including a girt, at least one inflatable float and an inflatable emergency life raft, wherein the life raft is attached to the at least one float with a flexible float cover including two halves that are fixedly attached to the at least one float at one end with an adhesive and releasably attached to each other at the other end using fasteners.

DETAILED DESCRIPTION

Figure 1:
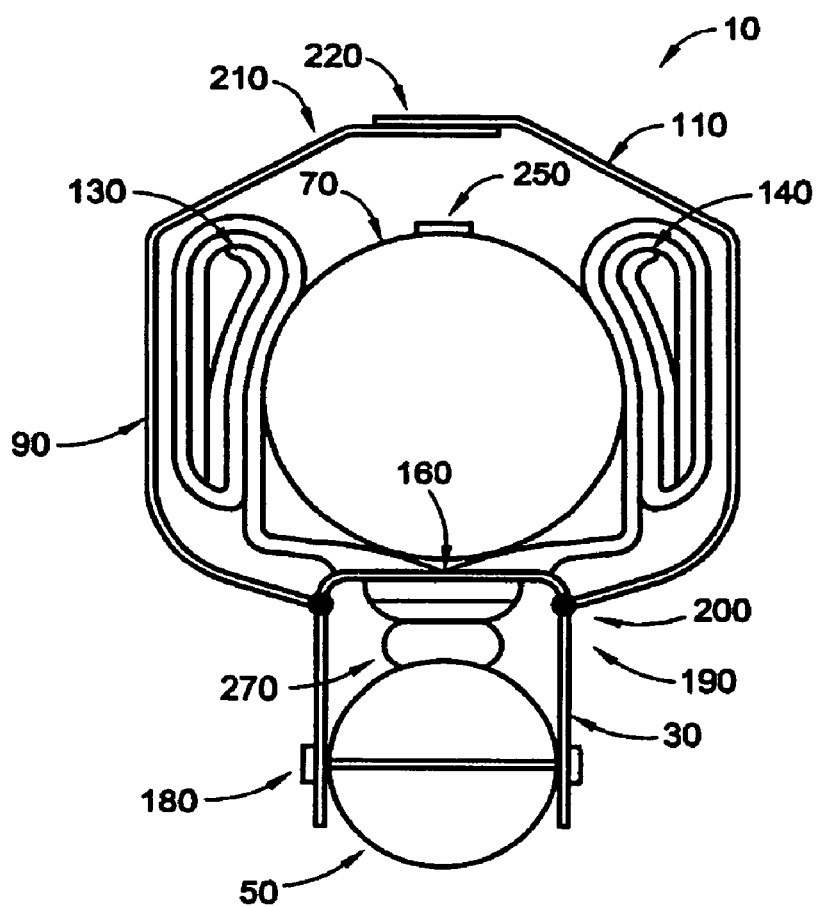
FIG. 1 depicts a sectional view of a packed emergency floatation system according to the present invention.

Referring to FIGS. 1-4 and 8, an emergency floatation system 10 according to the present invention is generally comprised of a girt member 30 for attachment to a landing skid 50 of an aircraft such as a helicopter 60, an emergency life raft 70, a float system 90 and a flexible cover 110. In the preferred embodiment depicted in FIGS. 1-3, the float system 90 includes a pair of large side floats 130,140 connected by a smaller center float 160. As one of ordinary skill in the art can appreciate, the float system 90 may consist of any number of alternative float arrangements that utilize any number of individual floats.

Figure 2:
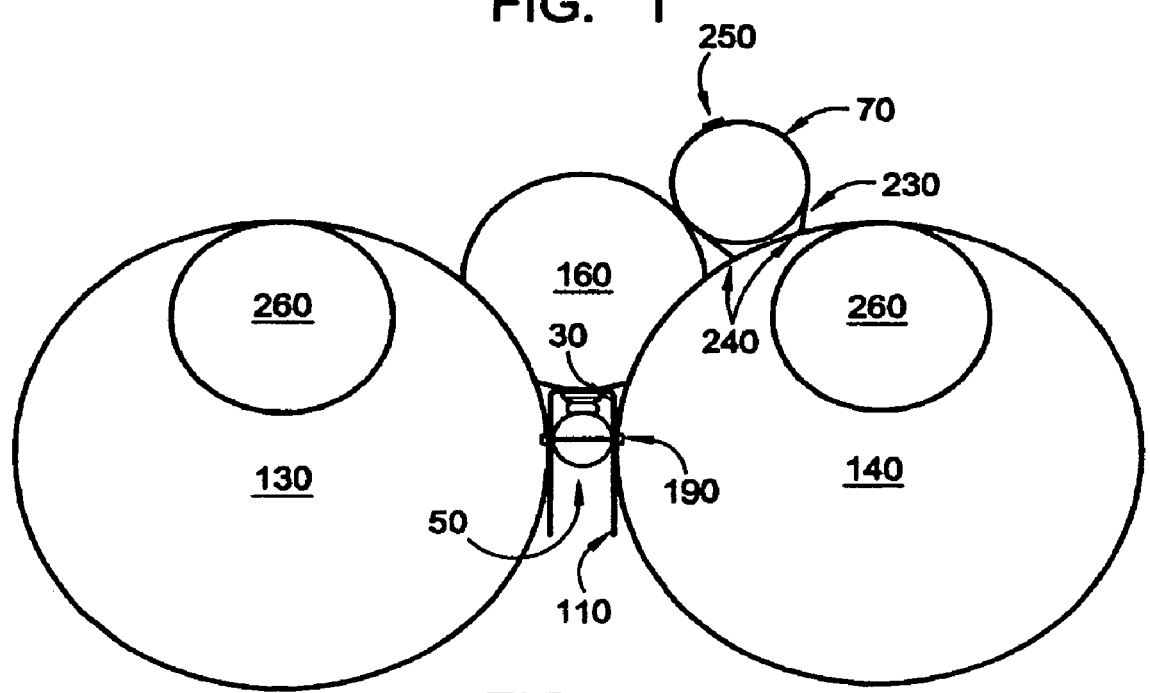
FIG. 2 depicts a sectional view of a partially deployed emergency floatation system according to the present invention.

Importantly, the floatation system 10 has three different configurations consisting of: (1) a packed configuration as depicted in FIG. 1; (2) a partially deployed configuration as depicted in FIG. 2, wherein the float system 90 has been fully deployed, but the raft 70 remains fully packed; and (3) a fully deployed configuration, which incorporates both the float configuration depicted in FIG. 2 and the inflated life raft 70 depicted in FIG. 4. Unless an emergency landing in water is necessary, the floatation system 10 should remain in the packed configuration.

The emergency floatation system 10 is attached to the landing skid 50 by first slipping the girt member 30 over the top of the landing skid 50 and then firmly securing the girt member 30 to the landing skid 50 using fasteners 180, such as a plurality of bolts 180. However, one of ordinary skill in the art would understand that any number of well-known mechanical fasteners could be used, including, but not limited to rivets, screws, adhesives, etc. Alternatively, the girt member 30 may be welded to the landing skid 50. Barring an emergency or a safety inspection, the floatation system 10 should remain attached to the skid 50 in the packed configuration.

One advantage of storing the life raft 70 under the helicopter fuselage is the amount of space that can be saved. Since inflatable life rafts commonly take up more than six cubic feet of space when deflated, a helicopter 60 can transport two extra passengers when the life raft 70 is stored under the helicopter 60. Another advantage of storing the inflatable raft 70 outside the helicopter 60 is that the raft 70 need not be manually expelled from the fuselage before being inflated. This saves valuable time and can avoid potential difficulties should the helicopter 60 be damaged or the passengers be injured.

Figure 3:
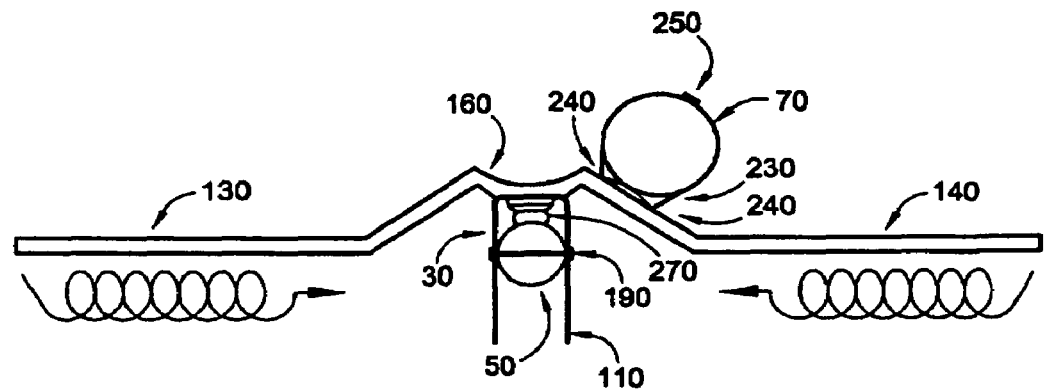
FIG. 3 depicts a sectional view of the emergency floatation system of FIG. 1 during packing.

Referring to FIG. 1, in the packed configuration, the flexible cover 110 surrounds the deflated floats 90, which are positioned around the packed life raft 70. The floats 90 are secured to the girt 30 by fixedly attaching the center float 160 to the top of the girt 30 using an adhesive such as cement, glue, epoxy resin, hinge tape or other adhesive. As best seen in FIG. 3, the deflated side floats 130,140 are rolled inwardly toward the girt member 30 before the flexible cover 110 is applied.

The flexible cover 110 comprises two halves, which are fixedly attached to the girt 30 at a first end 190 using fasteners 200 such as nuts 200, bolts 200 and washers 200, and releasably attached at a second end 210 using fasteners 220 such as strips of hook and loop fasteners 220, snaps, and laces 220. Preferably, these fasteners 220 are used in combination so that the cover 110 is tightly secured about the floats 90 and life raft 70. As one of ordinary skill in the art would understand, strips of hook and loop fasteners having embedded snaps can be used to provide a more robust attachment at the second end 210 of the flexible cover 110, and laces can be used to tighten the attachment once the snaps and hook and loop fasteners are connected.

Referring to FIG. 3, a flexible life raft cover 230 surrounds the packed life raft 70 and attaches it to the large side float 140. As one of ordinary skill in the art can appreciate, the life raft 70 may alternatively be attached to any other element of the floatation system 10 including large side float 130, center float 160, or girt member 30. The flexible life raft cover 230 includes two halves that are fixedly attached to the large side float at one end 240 using an adhesive such as cement, glue, epoxy resin, hinge tape or other adhesive, and releasably attached at the other end using fasteners 250 such as snaps 250, hook and loop fasteners 250, laces or a combination thereof.

Referring to FIG. 2, the emergency floatation system 10 is partially deployed when a water landing is required. In the partially deployed configuration, the floats 90 are inflated while the raft 70 remains packed. In addition, the flexible cover 110 together with a pair of circular end caps 260 hang from the inflated floatation system 10. In the packed configuration, the end caps 260 are attached to the flexible cover 110 using a strip of hook and loop fasteners along the outer perimeter of the circular end caps 260. The end caps 260 may include pockets containing survival equipment.

Inflation of the floats 90 is achieved using of an actuator, such as an electrical or mechanical switch, to release a canister of compressed gas into an air hose, through inlet check valve 270 and into the floats 90. The force of the compressed gas into the floats 90 must be sufficient to disengage the fasteners 220 to pop open the flexible cover 110 and end caps 260. The canister of gas may be mounted underneath the helicopter 60 or within the helicopter fuselage. Helium is the preferred gas because it permits a very fast rate of inflation. Other suitable gases include, but are not limited to, Nitrogen and air.

Figure 8:
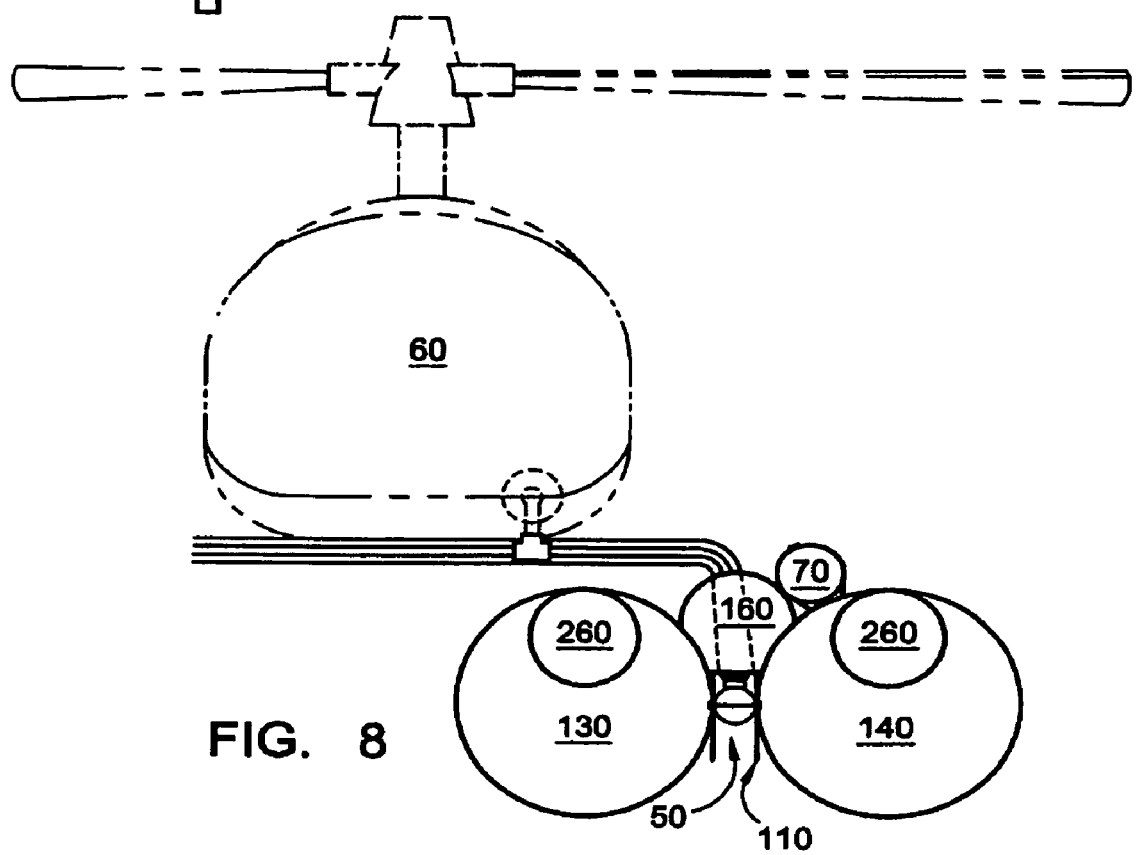
FIG. 8 depicts a sectional view of a partially deployed emergency floatation system attached to a helicopter according to the present invention.

According to the partially deployed float configuration depicted in FIG. 2, the center float 160 sits atop girt member 30 and the side floats 130,140 straddle the girt 30 on either side, providing a wide footprint of buoyancy. As best seen in FIG. 8, the large side floats 130,140 extend well beneath the girt member 30, and thus, well below the landing skid 50 of the helicopter 60. The life raft 70 is preferably attached near the top of side float 140. As one of ordinary skill in the art would appreciate, there may be any number of alternative arrangements among the life raft 70 and floats 90.

Figure 4:
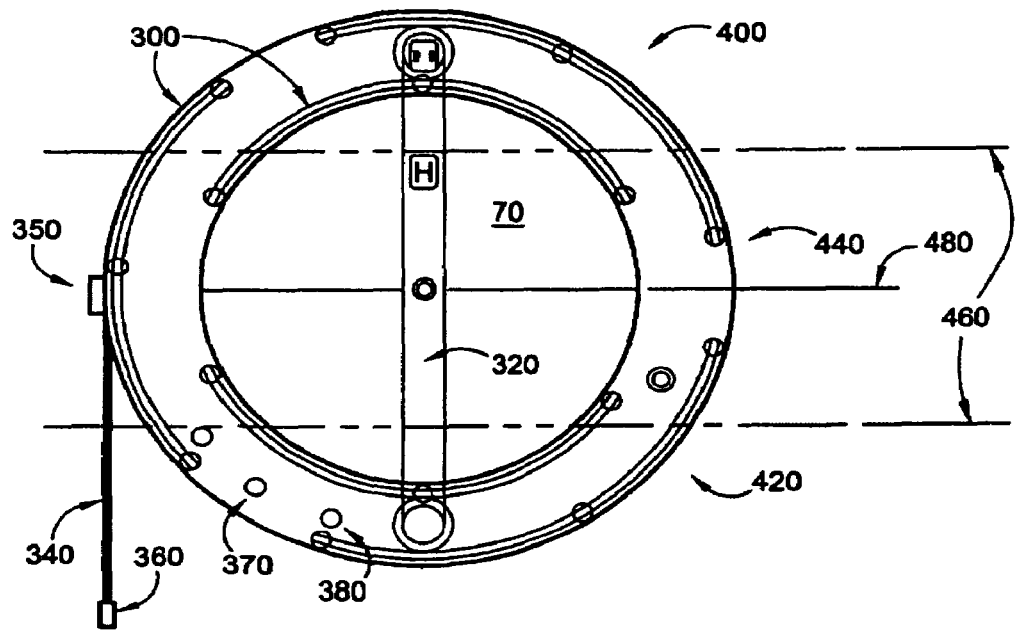
FIG. 4 depicts a top perspective view of a fully deployed inflatable raft of an emergency floatation system according to the present invention.

After an emergency water landing, life raft 70 may be needed to keep the survivors afloat until help arrives. Inflation of the life raft 70 is also achieved using an actuator such as an electrical switch to release a canister of compressed gas into an air hose 340, through inlet check valve 350 and into the life raft 70. The force of the compressed gas into the life raft 70 must be sufficient to disengage the fasteners 250 and pop open the flexible life raft cover 230. Likewise, the canister of gas may be mounted underneath the helicopter 60 or within the helicopter fuselage. Nitrogen is the preferred gas because it permits a slower rate of inflation, and therefore, greater control of how the life raft 70 unfolds. Other suitable gases include, but are not limited to, Helium, air, etc. In the fully deployed configuration, both the floats 90 and the life raft 70 have been inflated. FIG. 4 depicts a top view of the life raft 70, which includes handles 300, cross bar 320 and air hose 340.

Conveniently, the life raft 70 includes a quick connector 360 having an automatic release mechanism for rapid detachment of the air hose 340 from the canister of Nitrogen. The life raft 70 further includes a pressure relief valve 370 for the release of gas if the life raft 70 is overfilled and a topping valve 380 for inflation of the life raft 70 using a hand pump.

Figure 5:
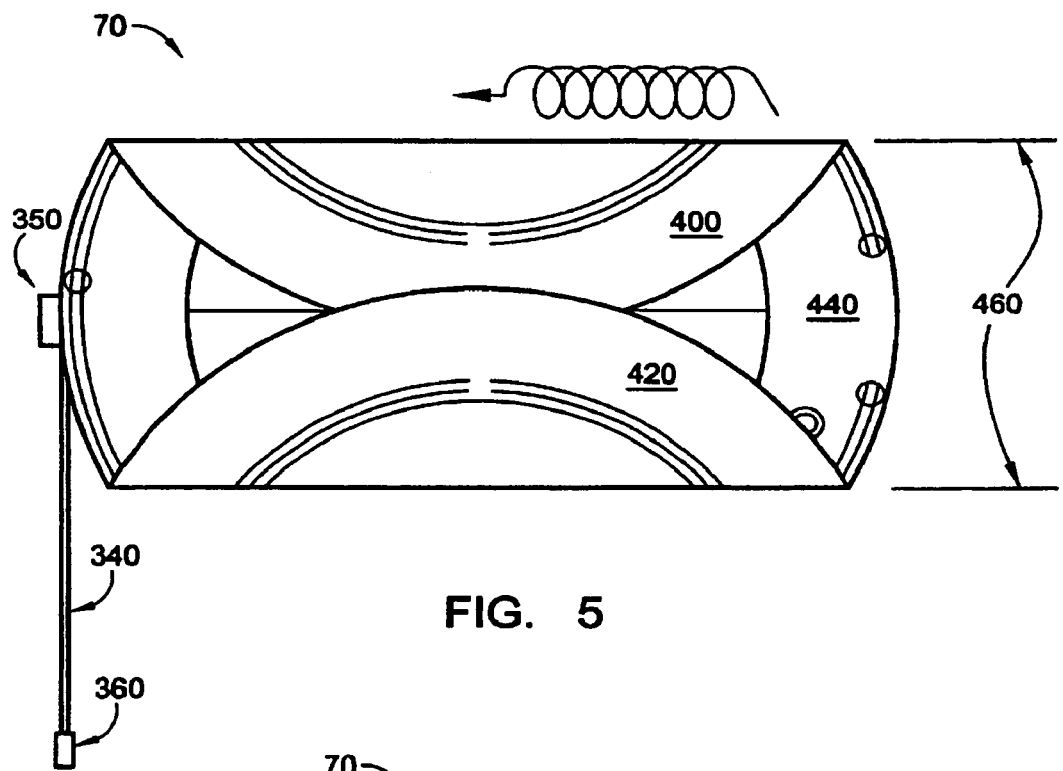
FIG. 5 depicts a perspective view of a deflated, partially packed inflatable raft of an emergency floatation system according to the present invention.
Figure 6:
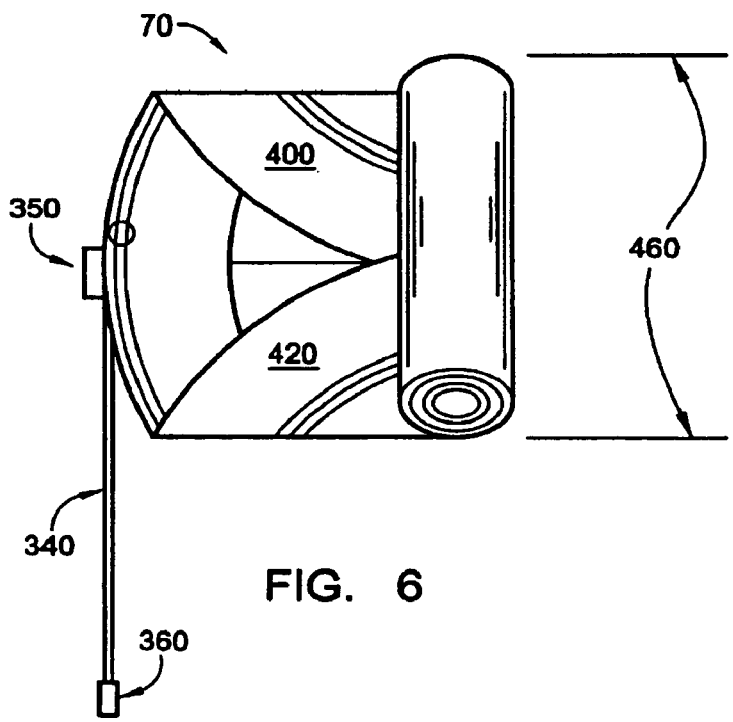
FIG. 6 depicts a perspective view of a deflated, fully packed inflatable raft of an emergency floatation system according to the present invention.
Figure 7:
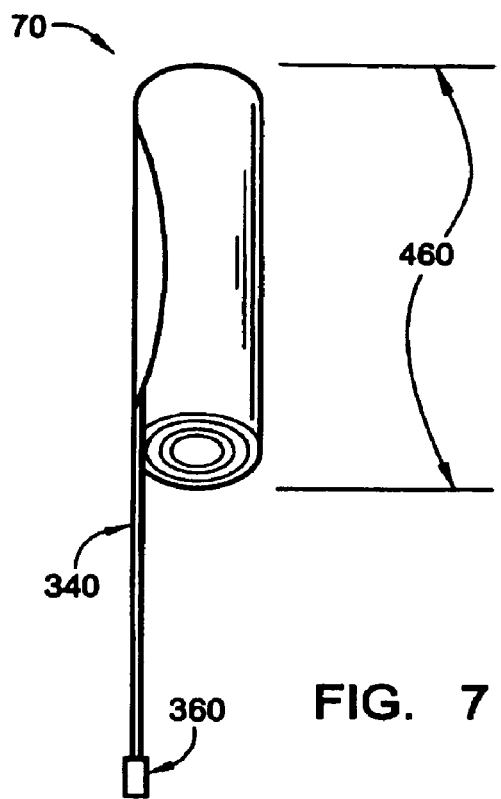
FIG. 7 depicts a perspective view of a deflated, fully packed inflatable raft of an emergency floatation system according to the present invention.

Referring to FIGS. 4-7, a preferred method of folding the life raft 70 to ensure proper inflation will now be described. For folding purposes, the raft 70 is divided into a top section 400, a bottom section 420 and a middle section 440 separated by fold lines 460. After deflating the raft 70, the top section 400 and bottom section 420 are folded up and towards centerline 480, as depicted in FIG. 5. As best seen in FIGS. 6 and 7, the folded raft 70 is then rolled up starting with the side opposite air hose 340 and rolling toward the air hose 340.

Many variations of the above-described invention are possible. Such variations are not to be regarded as a departure from the spirit and scope of the invention, but rather as subject matter intended to be encompassed within the scope of the following claims, to the fullest extent allowed by applicable law.

What is claimed is:

1. A floatation system attached to a helicopter, comprising:
    a girt attached to the helicopter;
    at least one float attached to the girt; and
    a life raft releasably attached to the at least one float;
    wherein the at least one float and the raft are releasably contained within a cover member in a packed configuration; and
        wherein the at least one float is adapted to support the helicopter and the raft is adapted to transport persons.

2. The floatation system of claim 1, wherein the system includes a partially deployed configuration in which the at least one float is inflated and the raft is deflated.

3. The floatation system of claim 2, wherein the system is adapted to be converted from the packed configuration to the partially deployed configuration by use of a first actuating member.

4. The floatation system of claim 1, wherein the raft and the at least one float are deflated in the packed configuration.

5. A floatation system in combination with a helicopter landing skid, comprising:
    at least one inflatable float attached to the landing skid; and
    an inflatable life raft that is adapted to be released from the helicopter when the life raft is inflated;
    wherein the at least one float and the raft are releasably contained within a cover member in a packed configuration.

6. The floatation system of claim 5, wherein the system is adapted to be converted from the packed configuration to a partially deployed configuration by use of a first actuating member.

7. The floatation system of claim 6, wherein the raft and the at least one float are deflated in the packed configuration.

8. The floatation system of claim 6, wherein the raft is deflated and the at least one float is inflated in the partially deployed configuration.

9. A floatation system attached to a helicopter landing skid, comprising:
    a helicopter float;
    a life raft adapted to be released from the helicopter; and
    a floatation system housing coupled to the helicopter landing skid,
    wherein the helicopter float is coupled to the housing, and
    wherein at least a portion of the housing extends above the landing skid and contains the float and life raft in a packed configuration.

10. The floatation system of claim 9, wherein the helicopter float is configured such that it is at least partially disposed below the landing skid when the floatation system is in a deployed configuration.

11. The floatation system of claim 9, wherein the housing comprises an elongate girt configured to be fixedly coupled to the skid.

12. The floatation system of claim 9, wherein the housing is configured such that it is sized to fit between the landing skid and the fuselage of the helicopter.

13. The floatation system of claim 9, wherein the helicopter float and the life raft are cylindrical in the packed configuration.

14. The floatation system of claim 9, further comprising a second helicopter float coupled to the housing.

15. The floatation system of claim 14, further comprising a third helicopter float interposed between the first and second helicopter floats.

16. The floatation system of claim 9, wherein the life raft is removeably coupled to the helicopter float.

* * * * *